(12) United States Patent
Kong et al.

(10) Patent No.: US 11,427,162 B2
(45) Date of Patent: Aug. 30, 2022

(54) CONTAMINANT REMOVAL APPARATUS FOR WINDSHIELDS

(71) Applicants: HYUNDAI MOTOR COMPANY, Seoul (KR); KIA MOTORS CORPORATION, Seoul (KR)

(72) Inventors: Nak Kyoung Kong, Seongnam-si (KR); Seung Hyeok Chang, Suwon-si (KR); Jong Min Park, Seoul (KR); Ki Hong Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 37 days.

(21) Appl. No.: 17/070,609

(22) Filed: Oct. 14, 2020

(65) Prior Publication Data

US 2021/0114561 A1   Apr. 22, 2021

(30) Foreign Application Priority Data

Oct. 18, 2019   (KR) .................. 10-2019-0130128

(51) Int. Cl.
*B60S 1/34* (2006.01)
*B60S 1/44* (2006.01)
*B60S 1/20* (2006.01)
*B60S 1/26* (2006.01)

(52) U.S. Cl.
CPC . *B60S 1/44* (2013.01); *B60S 1/20* (2013.01); *B60S 1/26* (2013.01); *B60S 1/3415* (2013.01); *B60S 1/3425* (2013.01)

(58) Field of Classification Search
CPC ............ B60S 1/44; B60S 1/26; B60S 1/3415
See application file for complete search history.

(56) References Cited

U.S. PATENT DOCUMENTS

| 3,739,486 | A | * | 6/1973 | Kallenberg | .......... | G03D 15/027 |
| | | | | | | 34/70 |
| 6,263,537 | B1 | * | 4/2001 | Salto | | |
| 2008/0047082 | A1 | | 2/2008 | Hong | | |
| 2018/0249754 | A1 | * | 9/2018 | DeVito | .................. | A23N 1/003 |
| 2019/0308371 | A1 | * | 10/2019 | Knecht | ................ | B29C 64/236 |

FOREIGN PATENT DOCUMENTS

| EP | 1908655 B1 | 9/2015 |
| JP | 6292538 B2 | 3/2018 |
| KR | 19990007700 | 2/1999 |
| KR | 20000020506 A | 12/2000 |
| KR | 101483929 B1 | 1/2015 |
| KR | 101857016 B1 | 5/2018 |

* cited by examiner

*Primary Examiner* — Michael D Jennings
(74) *Attorney, Agent, or Firm* — Lempia Summerfield Katz LLC (57) ABSTRACT

A contaminant removal apparatus for windshields includes: driving belts located at both side surfaces of a windshield; a drive unit configured to apply driving force to the driving belts; a wiper assembly located on the windshield; rotary rollers configured to be shifted along the driving belts; idle gears located at ends of the driving belts to change a rotating direction of the rotary rollers; frame connection shafts coupled to both ends of the wiper assembly and located within the rotary rollers so as to contact the idle gears to change the rotating direction of the rotary rollers; and a controller configured to change a rotating direction of the rotary rollers when the idle gears and the frame connection shafts contact.

14 Claims, 7 Drawing Sheets

CONTAMINANT REMOVAL APPARATUS FOR WINDSHIELDS

CROSS-REFERENCE TO RELATED APPLICATION

This application claims under 35 U.S.C. § 119(a) the benefit of priority to Korean Patent Application No. 10-2019-0130128 filed on Oct. 18, 2019, the entire contents of which are incorporated herein by reference.

BACKGROUND

(a) Technical Field

The present disclosure relates to a contaminant removal apparatus for windshields. More particularly, it relates to a contaminant removal apparatus for windshields, which is configured such that a wiper assembly located in the width direction of a windshield of a vehicle is shifted towards the upper and lower ends of the windshield in the height direction thereof. Thus, contaminants may be removed from the windshield and coating of the windshield may be performed so as to improve user visibility.

(b) Background Art

A wiper apparatus is provided under a front or rear windshield of a vehicle and thus serves to wipe the windshield so that snow or rain does not obscure the driver's view and the passenger's view. Since a radius of operation of a wiper blade performing reciprocating angular motion about an axis of rotation is limited structurally, blind spots in which cleaning is not carried out occur. Thus, when the vehicle drives in inclement weather conditions, such as heavy rain or heavy snow, risks of traffic accidents caused by a reduced field of view are increased.

Therefore, structural improvement to secure a wider wiping area has been required, and a linearly reciprocating wiper apparatus has been proposed. The apparatus includes a driving unit to convert rotary motion into reciprocating rotary motion by power transmitted from a motor, a subordinate unit configured to be symmetrical with the driving unit so as to be interlocked with the driving unit, and a blade connected to the driving unit and the subordinate unit so as to wipe a windshield.

However, this linearly reciprocating wiper apparatus cannot be normally operated due to reduction in a contact area if the wiper blade is rotated during an ascending and descending process.

Further, if the wiper blade is shifted towards the upper and lower ends of the windshield only by driving force of the motor, the wiper blade is pushed back and thus cannot provide visibility satisfying a drive unit request.

SUMMARY OF THE DISCLOSURE

The present disclosure has been made in an effort to solve the above-described problems associated with the prior art. It is an object of the present disclosure to provide a contaminant removal apparatus for windshields, which is shifted towards the upper and lower ends of a windshield so as to remove the contaminants for the windshield.

It is another object of the present disclosure to provide a contaminant removal apparatus for windshields, which may remove contaminants from a windshield through different blades when the contaminant removal apparatus is shifted towards the upper end of the windshield and shifted towards the lower end of the windshield.

It is yet another object of the present disclosure to provide a wiper assembly having a widthwise length, which is varied depending on the width of a windshield.

In one aspect, the present disclosure provides a contaminant removal apparatus for windshields. The apparatus includes: driving belts located at both side surfaces of a windshield; a drive unit configured to apply driving force to the driving belts; a wiper assembly located on the windshield; rotary rollers configured to be shifted along the driving belts; idle gears located at ends of the driving belts to change a rotating direction of the rotary rollers; frame connection shafts coupled to both ends of the wiper assembly and located within the rotary rollers so as to contact the idle gears to change the rotating direction of the rotary rollers; and a controller configured to change a rotating direction of the rotary rollers when the idle gears and the frame connection shafts contact.

In one embodiment, the wiper assembly may include a frame configured to be coupled to the frame connection shafts, a first blade located at one end of the frame, and a second blade located at the other end of the frame. As the frame is rotated about the frame connection shafts, the first blade and the second blade may selectively contact the windshield.

In another embodiment, when the frame connection shafts contact the idle gears, the controller may rotate the frame by a designated angle, and then may change the rotating direction of the rotary rollers.

In still another embodiment, a washer fluid nozzle may be provided at a position adjacent to the first blade. A washer fluid may be sprayed onto an upper surface of the windshield through the washer fluid nozzle.

In yet another embodiment, a coating nozzle may be provided at a position adjacent to the second blade. A coating fluid may be sprayed onto an upper surface of the windshield through the coating nozzle.

In still yet another embodiment, the frame may include at least two sub-frames. The at least two sub-frames may overlap each other so that a length of the frame is varied in a width direction of the windshield.

In a further embodiment, the contaminant removal apparatus for windshields may further include guide rails located along the windshield. The driving belts may be located within the guide rails.

In another further embodiment, the idle gears may contact the frame connection shafts to change the rotating direction of the rotary rollers.

In still another further embodiment, the controller may control the wiper assembly to be located at an uppermost or lowermost end of the windshield when the wiper assembly is not operated.

In yet another further embodiment, the first blade may be configured to be located closer to an upper end of the windshield than the second blade and may contact the windshield when the wiper assembly is shifted downwards along the windshield.

In still yet another further embodiment, the second blade may contact the windshield when the wiper assembly is shifted upwards along the windshield.

In a still further embodiment, the controller may control the wiper assembly to be locally shifted within a region of the windshield where a sensor unit is installed.

Other aspects and embodiments of the disclosure are discussed hereinbelow.

The above and other features of the disclosure are discussed hereinbelow.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus do not limit the present disclosure, and wherein.

It should be understood that the appended drawings are not necessarily to so scale, presenting a somewhat simplified representation of various features illustrating the basic principles of the present disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Hereinafter reference is made in detail to various embodiments of the present disclosure, examples of which are illustrated in the accompanying drawings and described below. While the disclosure is described in conjunction with specific embodiments, it should be understood that the present description is not intended to limit the disclosure to the specific embodiments. On the contrary, the disclosure is intended to cover not only the specific embodiments, but also various alternatives, modifications, equivalents and other embodiments within the spirit and scope of the disclosure as defined by the appended claims.

In the following description of the embodiments, terms, such as " . . . belt", " . . . part", " . . . assembly", etc., mean units to process at least one function or operation, and these may be implemented by hardware, software or a combination of hardware and software. When a belt, part, assembly, unit, component, device, controller, element, or the like of the present disclosure is described as having a purpose or performing an operation, function, or the like, the belt, part, assembly, unit, component, device, controller, or element should be considered herein as being "configured to" meet that purpose or to perform that operation or function. Further, the controller described herein may include a processor programmed to perform the noted operation, function, or the like.

Further, in the following description of the embodiments, it should be understood that directions, such as right, etc., are set based on the front of a vehicle.

Also, in the following description of the embodiments, terms, such as "first", "second", etc., may be used to describe various elements but do not limit the elements. These terms are used only to distinguish one element from other elements, and do not limit the sequence of the elements.

In addition, in the following description of the embodiments, "windshields" conceptually include a front windshield, a side window, a rear windshield, etc., and have a meaning of windshields located at all positions.

Moreover, a vehicle equipped with a contaminant removal apparatus for windshields in accordance with the present disclosure may not only include a manual vehicle but also include an autonomous vehicle.

The present disclosure relates to a contaminant removal apparatus 100 for windshields, which is shifted in the height direction of a windshield 700, and more particularly to the contaminant removal apparatus 100 for windshields in which a wiper assembly 200 is formed along the width of the windshield 700. The wiper assembly 200 is shifted in the height direction by driving force received from driving belts 120 located at both sides of the windshield 700. Thus, contaminants may be removed from the surface of the windshield 700.

Figure 1:
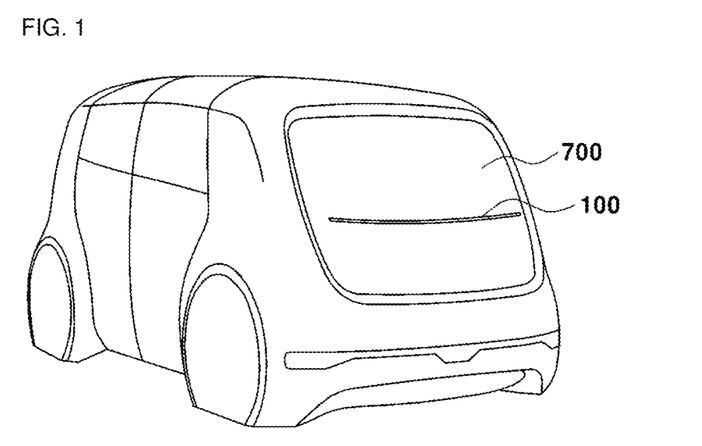
FIG. 1 is a perspective view of a vehicle equipped with a contaminant removal apparatus for windshields in accordance with one embodiment of the present disclosure.
Figure 2:
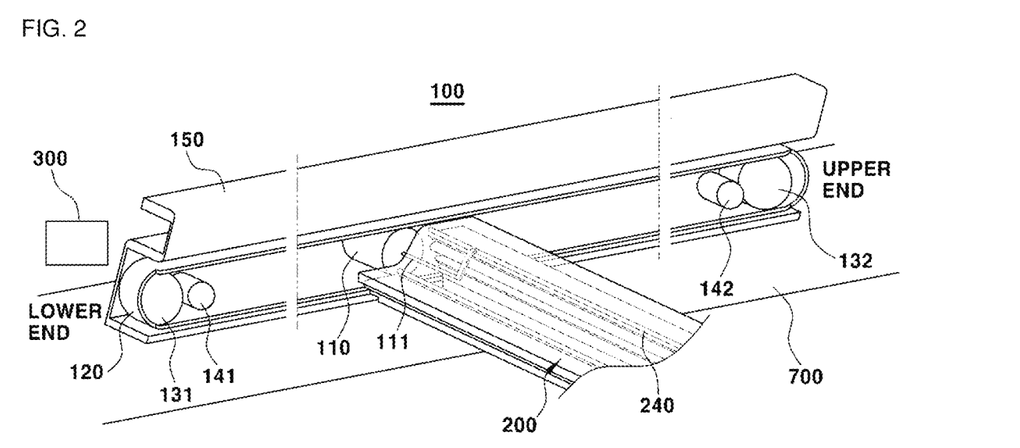
FIG. 2 is a view illustrating the contaminant removal apparatus for windshields in accordance with one embodiment of the present disclosure, which is located at one side end of a windshield.

FIG. 1 is a perspective view of the vehicle equipped with the contaminant removal apparatus 100 for windshields in accordance with one embodiment of the present disclosure. FIG. 2 is a view illustrating one side end of the windshield 700, at which the contaminant removal apparatus 100 for windshields is located.

As shown in FIG. 1, the vehicle includes the windshield 700, which is located at the front portion of the vehicle, and the contaminant removal apparatus 100 for windshields, which is located at the windshield 700. The contaminant removal apparatus 100 for windshields may be configured to be located at the windshield 700 of the vehicle and may be configured to be located at a rear windshield, a side window, etc. of the vehicle.

The wiper assembly 200 of the contaminant removal apparatus 100 for windshields may be configured to be locally used only in a region of the vehicle where a sensor unit (not shown) is located, and the sensor unit may include a rain sensor, and a sensor to measure a distance for driving of the vehicle (a RADAR, a LIDAR, or the like).

The contaminant removal apparatus 100 for windshields includes, as shown in FIG. 2, the wiper assembly 200, which is located at the windshield 700 and is configured such that at least a part of the wiper assembly 200 may contact the outer surface of the windshield 700. The apparatus 100 further includes frame connection shafts 111, which are configured to be coupled to a frame 240 of the wiper assembly 200. The apparatus 100 further includes rotary rollers 110, which are located at the outside of the frame connection shaft 111 and rotated to move due to driving force of the driving belts 120 located at both side ends of the windshield 700.

The driving belts 120 are configured to be coupled to a drive unit 300 located within the vehicle, and thus perform a caterpillar motion.

More particularly, the driving belts 120 are configured to be located at both side ends of the windshield 700. At least one of the upper or lower end of the driving belts 120 is coupled to the drive unit 300 such that driving force of the drive unit 300 is applied to the driving belts 120.

The contaminant removal apparatus 100 for windshields may include guide rails 150 configured to surround the driving belts 120. The guide rails 150 may be configured to be located at both side ends of the windshield 700 such that the driving belts 120 are located inside the guide rails 150.

The rotary rollers 110 are rotated to move in the rotating direction of the driving belts 120 and provided inside the driving belts 120. The rotary rollers 110 are configured to be rotated in the same direction as the rotating direction of the driving belts 120. Thus, to perform a reciprocating motion to the upper and lower ends of the windshield 700 in the height direction of the windshield 700.

A central axis of the rotary roller 110 includes the frame connection shaft 111 connected to the frame 240 of the wiper assembly 200. The frame connection shaft 111 is provided independently of the rotary roller 110. Thus, even if the rotary roller 110 is rotated along the driving belt 120, the frame connection shaft 111 is not rotated due to contact between the wiper assembly 200 and the windshield 700 and is shifted towards the upper and lower ends of the windshield 700.

The driving belts 120 are configured such that driving force of the drive unit 300 is applied to the driving belts 120 through a driving gear located at least one or both ends of the windshield 700. Idle gears 141, 142, which contact the driving gear so as to be interlocked with the rotating direction of the driving gear, may be configured to contact the frame connection shaft 111, which is shifted in the height direction of the windshield 700 simultaneously with the rotary roller 110.

More particularly, a lower idle gear 141 is configured to contact the frame connection shaft 111 when the wiper assembly 200 is shifted downwards and thus located at the lower end of the windshield 700. An upper idle gear 142 is configured to contact the frame connection shaft 111 when the wiper assembly 200 is shifted upwards and thus located at the upper end of the windshield 700.

The idle gears 141, 142 are configured to change the rotating direction of the frame connection shaft 111 coupled to the rotary roller 110. More particularly, the idle gears 141, 142 are configured to rotate the frame connection shaft 111 by a predetermined angle and to change the rotating direction of the rotary roller 110 interlocked with the frame connection shaft 111 at the moment when the frame connection shaft 111 and the corresponding idle gear 140 contact.

Moreover, the wiper assembly 200 coupled to the frame connection shaft 111 is configured such that the direction of the rectilinear motion of the wiper assembly 200 is changed according to the change of the rotating direction of the rotary roller 110.

In other words, since the drive unit 300 changes the rotating direction of the driving gear when the idle gears 141, 142 and the frame connection shaft 111 are in contact, the frame connection shaft 111 contacting the idle gears 141, 142 is first rotated by the predetermined angle. The rotating direction of the rotary roller 110 is then changed so that the direction of the rectilinear motion of the wiper assembly 200 may be changed.

More particularly, since a controller 400 is configured to change the rotating direction of the drive unit 300 when the idle gears 141, 142 and the frame connection shaft 111 are in contact, the rotating direction of the driving belt 120 is changed. Thus, the direction of the rotary motion and the direction of the rectilinear motion of the rotary roller 110 may be changed.

Further, the frame 240 connected to the frame connection shaft 111 is configured to be rotated by a predetermined angle. Thus, a first blade 210 and a second blade 220 may selectively contact the windshield 700 according to shifting of the wiper assembly 200 to the upper and lower ends of the windshield 700.

Figure 3A:
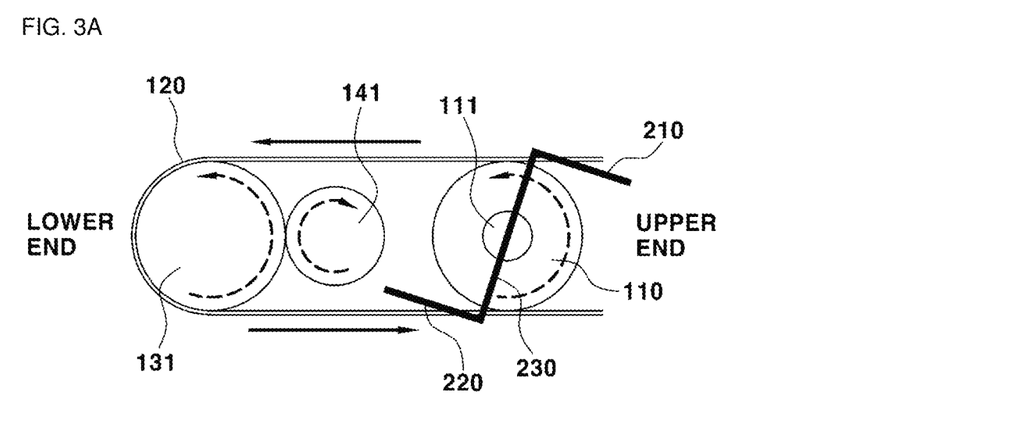
FIG. 3A is a side view of the contaminant removal apparatus for windshields in accordance with one embodiment of the present disclosure, which is shifted downwards along the windshield.

A shown in FIG. 3A, the frame 240 of the wiper assembly 200 is configured to include an inclined part 230, which is inclined at a designated angle. The first blade 210 and the second blade 220 are respectively located at both ends of the frame 240.

Therefore, in accordance with one embodiment of the present disclosure, the second blade 220 may contact the upper surface of the windshield 700 when the frame 240 is shifted upwards. The first blade 210 may contact the upper surface of the windshield 700 when the frame 240 is shifted downwards.

On the other hand, in accordance with another embodiment of the present disclosure, the first blade 220 may contact the windshield 700 when the frame 240 is shifted upwards. The second blade 220 may contact the windshield 700 when the frame 240 is shifted downwards.

In summary, the contaminant removal apparatus 100 for windshields in accordance with the present disclosure may be configured such that the blade contacting the windshield 700 while the wiper assembly 200 is shifted upwards and the blade contacting the windshield 700 while the wiper assembly 200 is shifted downwards are different.

Each of the first blade 210 and the second blade 220 may include one of a wiper blade, which may remove contaminants, and a coating blade, and be set to one of these blades at user request.

Besides, each of the first blade 210 and the second blade 220 may include a double-edged blade so as to more easily remove contaminants from the windshield 700.

The controller 400 in accordance with the present disclosure is configured to receive a signal indicating contact between the idle gear 140 and the frame connection shaft 111. The controller 400 is also configured to control the rotating direction of the drive unit 300 when the controller 400 receives the signal indicating the contact between the idle gear 140 and the frame connection shaft 111.

Moreover, the controller 400 is configured to receive data about precipitation from the rain sensor (not shown) and configured to control the shifting time and the number of times of shifting of the wiper assembly 200 based on the received data.

Further, the controller 400 is configured to control the wiper assembly 200 to be locally shifted within a region of the windshield 700 where the sensor unit (not shown) is installed.

Further, the controller 400 is configured to control the contaminant removal apparatus 100 for windshields so that the wiper assembly 200 is located at the uppermost end or the lowermost end of the windshield 700, if there is no user request to drive the wiper assembly 200.

Figure 3B:
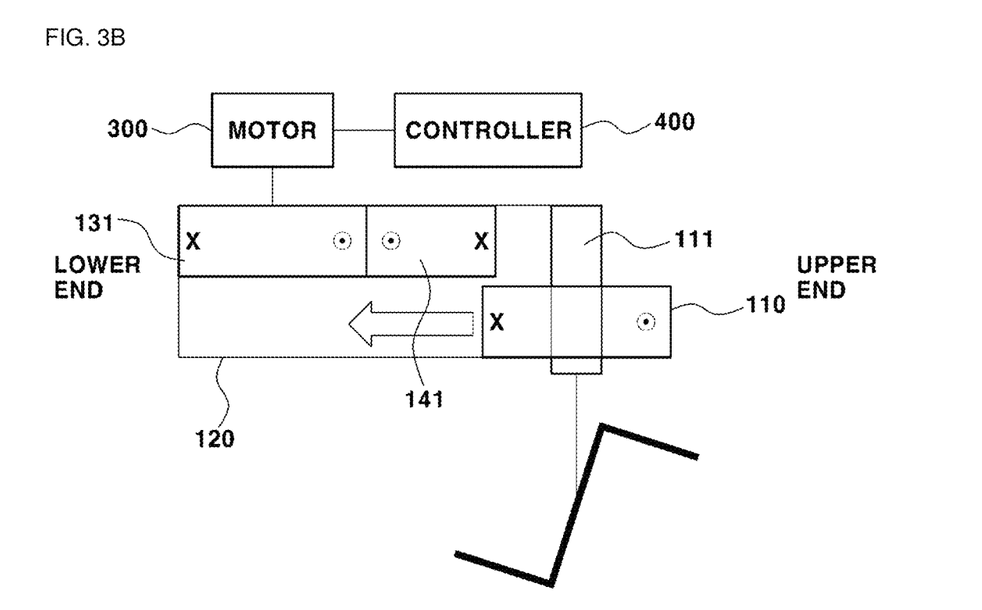
FIG. 3B is a front view of the contaminant removal apparatus for windshields in accordance with one embodiment of the present disclosure, which is shifted downwards along the windshield.

FIG. 3A is a right cross-sectional view of the windshield 700 when the wiper assembly 200 is shifted towards the lower end of the windshield 700. FIG. 3B is a front view of the windshield 700 in this state.

A lower driving roller or gear 131 is rotated in the counterclockwise direction by receiving a driving force from the drive unit 300. Thus, the lower idle gear 141 is rotated in the clockwise direction by receiving rotating force from the lower driving roller 131.

When the driving belt 120 is rotated in the counterclockwise direction depending on the rotating direction of the lower driving roller 131, the rotating roller 110 is rotated about the frame connection shaft 111 in the same direction as the driving belt 120, and thus is shifted towards the lower end of the windshield 700.

The frame 240 coupled to the frame connection shaft 111 is configured such that the upper end of the frame 240 may be inclined towards the windshield 700 by a designated angle. Thus, the first blade 210 located at the rear end of the frame 240 contacts the windshield 700 when the wiper assembly 200 is shifted towards the lower end of the windshield 700.

The first blade 210 may include a wiper blade. When the wiper assembly 200 is shifted downwards, the wiper blade removes contaminants from the windshield 700.

Figure 4A:
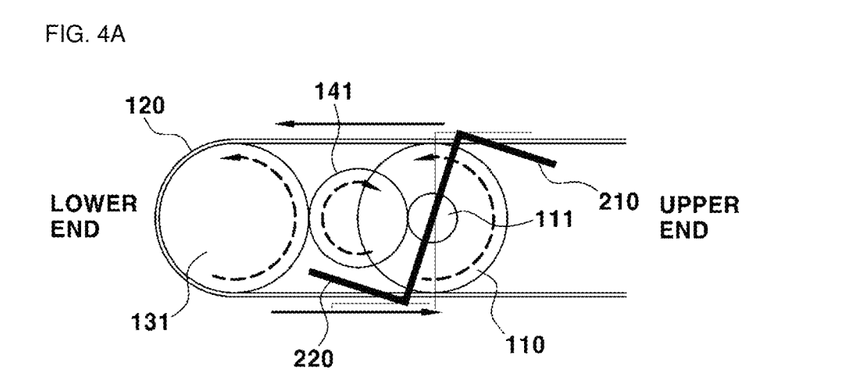
FIG. 4A is a side view of the contaminant removal apparatus for windshields in accordance with one embodiment of the present disclosure, in a state in which a frame connection shaft and an idle gear contact at the lower end of the windshield.
Figure 4B:
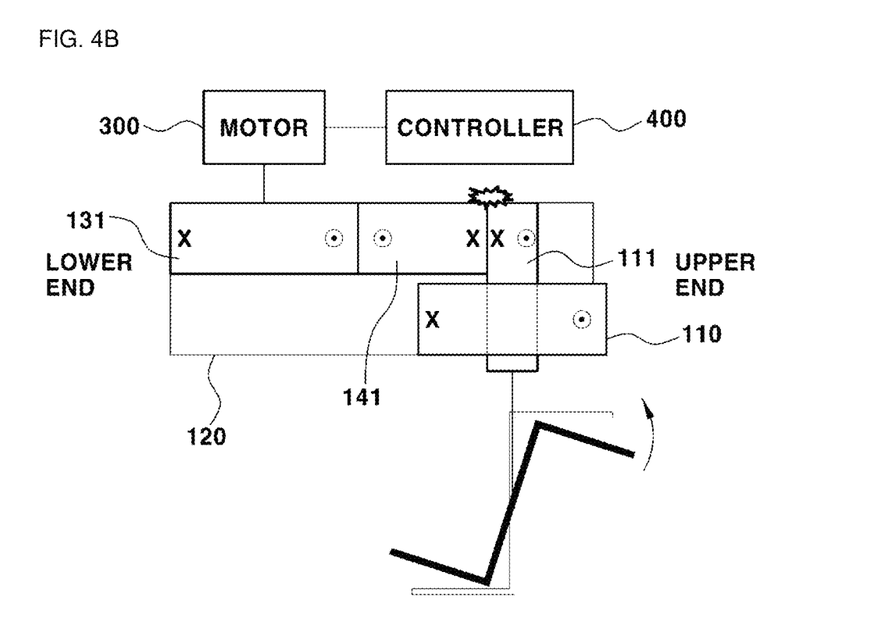
FIG. 4B is a front view of the contaminant removal apparatus for windshields in accordance with one embodiment of the present disclosure, in the state in which the frame connection shaft and the idle gear contact at the lower end of the windshield.

FIG. 4A is a right cross-sectional view of the windshield 700 at the moment when the wiper assembly 200 is shifted downwards and thus the frame connection shaft 111 and the lower idle gear 141 are in contact. FIG. 4B is a front view of the windshield 700 in this state.

As shown in FIGS. 4A and 4B, when the rotary roller 110 is shifted towards the lowermost end of the windshield 700, the frame connection shaft 111 and the lower idle gear 141 are in contact. When the frame connection shaft 111 and the lower idle gear 141 are in contact, a signal indicating the contact is applied to the controller 400, and the controller 400 changes the rotating direction of the drive unit 300.

The frame connection shaft 111 includes the central axis of the rotary roller 110 and extends towards one side end of the windshield 700 adjacent thereto as compared to the width of the rotary roller 110. In other words, as compared to the width of the rotary roller 110, the frame connection shaft 111 protrudes towards one side end of the windshield 700 in the width direction.

The frame connection shaft 111, which protrudes to the outside of the rotary roller 110, is located to contact the lower idle gear 141. The lower idle gear 141 is configured to change the rotating direction of the frame connection shaft 111 without contact with the rotary roller 110.

More particularly, when the frame connection shaft 111 contacts the lower idle gear 141, the frame connection shaft 111 is first rotated by the predetermined angle in the proceeding direction frame connection shaft 111. The rotating direction of the lower driving roller 131 is then changed due to driving force.

When the frame connection shaft 111 contacts the lower idle gear 141, the frame 240 is rotated by the predetermined angle simultaneously with the frame connection shaft 111 so that the first blade 210 is spaced apart from the windshield 700 and the second blade 220 comes into contact with the windshield 700.

As the rotating direction of the drive unit 300 is changed by the controller 400, the rotating direction of the driving belt 120 is changed from the counterclockwise direction to the clockwise direction. The rotating direction of the lower idle gear 141 is changed from the clockwise direction to the counterclockwise direction.

The frame connection shaft 111 contacting the lower idle gear 141 is rotated in the clockwise direction in response to the rotating direction of the lower idle gear 141. Thus, the frame connection shaft 111 and the rotary roller 110 are rotated in the clockwise direction and shifted towards the upper end of the windshield 700.

In summary, since the frame connection shaft 111 is configured to be shifted independently of the rotary roller 110, when the frame connection shaft 111 is shifted downwards and contacts the lower idle gear 141, the frame connection shaft 111 is rotated by a designated angle independently of the rotary roller 110. Thereafter, as the rotating direction of the drive unit 300 is changed, the frame connection shaft 111 and the rotary roller 110 are simultaneously rotated in the direction opposite to the rotating direction thereof when the frame connection shaft 111 and the rotary roller 110 are shifted downwards. Thus, the proceeding direction of the wiper assembly 200 may be changed.

Figure 5A:
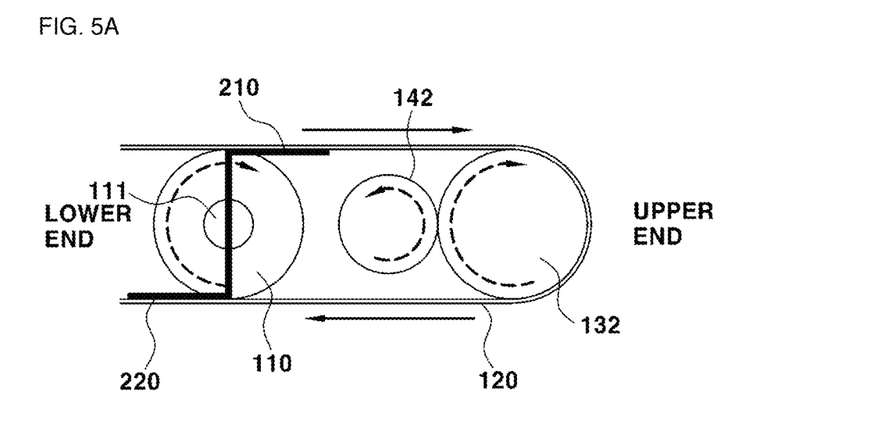
FIG. 5A is a side view of the contaminant removal apparatus for windshields in accordance with one embodiment of the present disclosure, which is shifted upwards along the windshield.
Figure 5B:
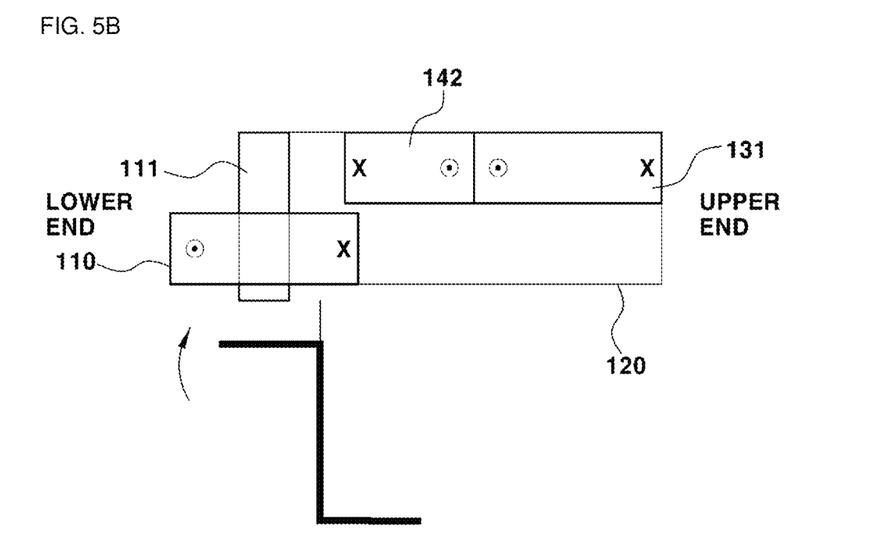
FIG. 5B is a front view of the contaminant removal apparatus for windshields in accordance with one embodiment of the present disclosure, which is shifted upwards along the windshield.

FIG. 5A is a right cross-sectional view of the windshield 700 when the wiper assembly 200 is shifted upwards. FIG. 5B is a front view of the windshield 700 in this state in which the wiper assembly 200 is shifted upwards.

As shown in FIGS. 5A and 5B, the rotary roller 110 is configured to be rotated in the clockwise direction by the lower idle gear 141 and the lower driving roller or gear 131 and to be shifted integrally with the wiper assembly 200 towards the upper end of the windshield 700.

Further, since the lower idle gear 141 and the frame connection shaft 111 contact and thus the frame 240 is rotated by the designated angle, the wiper assembly 200 is shifted towards the upper end of the windshield 700 while maintaining the contact state of the second blade 220 with the windshield 700.

The second blade 220 may include a coating blade configured to perform coating of the windshield 700 and may include two or more blades.

Further, the drive unit 300 is coupled to at least one of the lower driving roller 131 or an upper driving roller 132 so as to apply a driving force. Thus, the upper driving roller 132 is rotated in the clockwise direction and the driving belt 120 is also rotated in the same direction as the upper driving roller 132.

Since the upper idle gear 142 is located to contact the upper driving roller 132, when the upper driving roller 132 is rotated in the clockwise direction, the upper idle gear 142 is rotated in the counterclockwise direction.

Figure 6A:
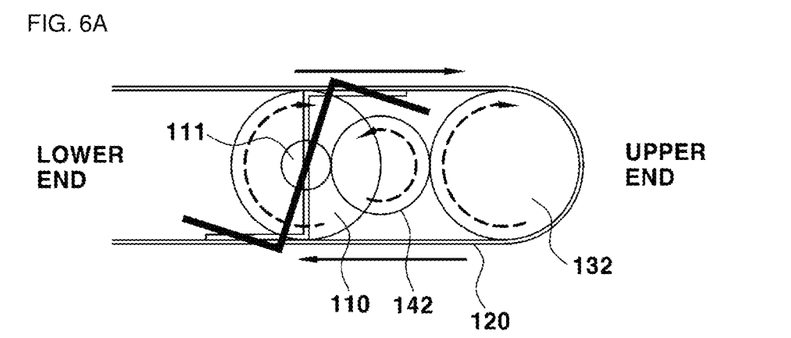
FIG. 6A is a side view of the contaminant removal apparatus for windshields in accordance with one embodiment of the present disclosure, in a state in which the frame connection shaft and the idle gear contact at the upper end of the windshield.
Figure 6B:
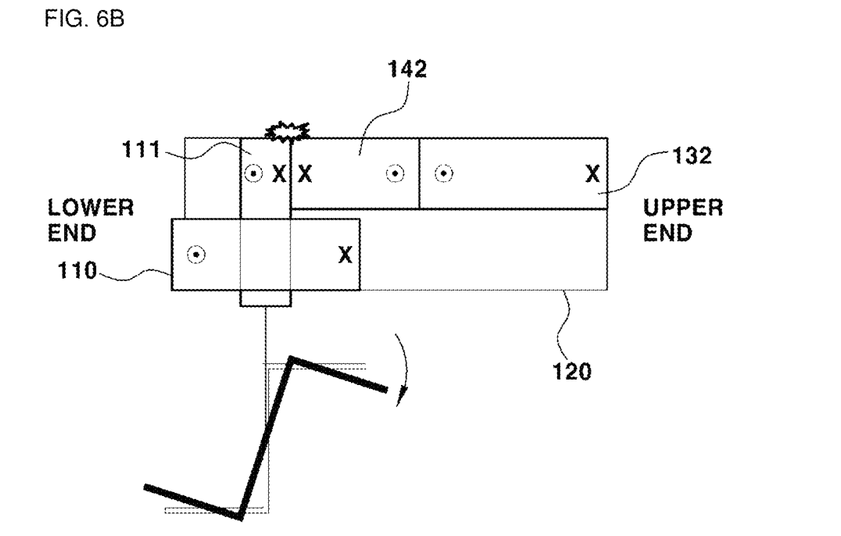
FIG. 6B is a front view of the contaminant removal apparatus for windshields in accordance with one embodiment of the present disclosure, in the state in which the frame connection shaft and the idle gear contact at the upper end of the windshield.

FIG. 6A is a right cross-sectional view of the windshield 700 at the moment when the wiper assembly 200 contacts the upper end of the windshield 700. FIG. 6B is a front view of the windshield 700 in a state in which the wiper assembly 200 is located at the upper end of the windshield 700.

As shown in FIGS. 6A and 6B, when the rotary roller 110 and the frame connection shaft 111, shifted towards the upper end of the windshield 700, are located at the uppermost end of the windshield 700, the upper idle gear 142 contacts the frame connection shaft 111.

When the frame connection shaft 111 contacts the upper idle gear 142, the frame connection shaft 111 is rotated by a designated angle so that the second blade 220 is spaced apart from the windshield 700 and the first blade 210 comes into contact with the upper surface of the windshield 700.

Since the frame connection shaft 111 is first rotated, and the rotating direction of the drive unit 300 is then changed, the driving belt 120 and the driving rollers 131, 132 are rotated so that the rotary roller 110 is shifted downwards under the condition that the first blade 210 contacts the upper surface of the windshield 700.

More particularly, the controller 400 receives a signal indicating contact between the upper idle gear 142 and the frame connection shaft 111 and changes the rotating direction of the drive unit 300 according to the received signal. Thus, the wiper assembly 200 is shifted towards the lower end of the windshield 700 along the rotating rollers 110 and the frame connection shafts 111.

In summary, the rotary rollers 110 and the frame connection shafts 111 are configured to be shifted towards the upper end or the lower end of the windshield 700 according to the rotating direction of the driving belts 120. Thus, the rotating direction of the rotary rollers 110 may be changed by the frame connection shafts 111 contacting the upper idle gear 142 located at the uppermost end of the windshield 700 and the lower idle gear 141 located at the lowermost end of the windshield 700.

Further, the frame 240 coupled to the frame connection shafts 111 is configured to be rotated by a designated angle prior to change of the rotating direction of the rotary rollers 110. The designated angle may be set such that the first blade 210 and the second blade 220 may selectively contact the windshield 700.

Figure 7A:
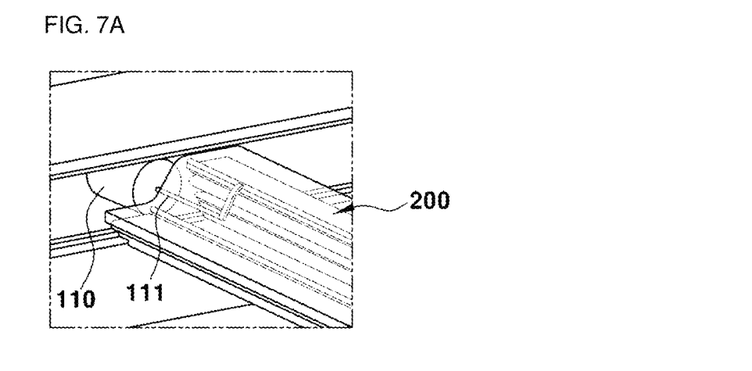
FIG. 7A is a view illustrating a coupling relation between a washer fluid nozzle and a washer fluid pipe connected to the washer fluid nozzle in accordance with one embodiment of the present disclosure.
Figure 7B:
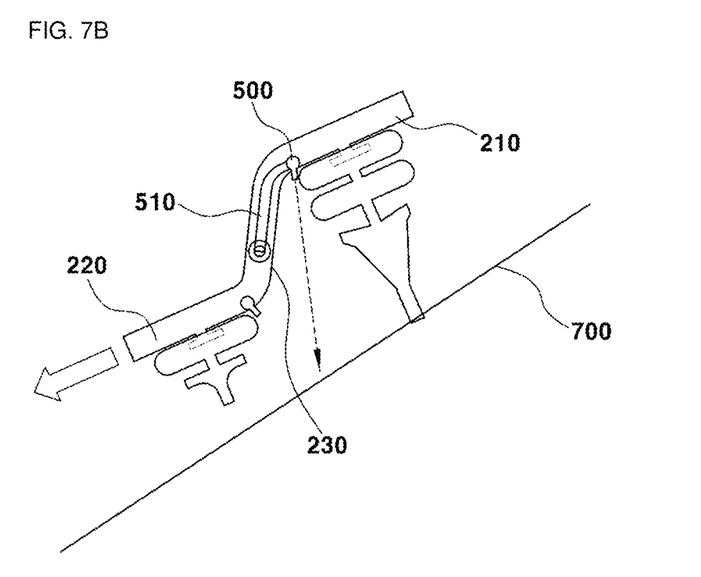
FIG. 7B is a side view of a frame on which the washer fluid nozzle is located, in accordance with one embodiment of the present disclosure.

FIG. 7A is a view illustrating a washer fluid pipe 510 located in the frame connection shaft 111. FIG. 7B is a view illustrating a coupling relation between a washer fluid nozzle 500 and an element connected to the washer fluid nozzle 500 to provide a washer fluid to the upper surface of the windshield 700.

In accordance with one embodiment of the present disclosure, the washer fluid nozzle 500 is configured to be located on a washer fluid assembly adjacent to the first blade 210. The washer fluid nozzle 500 includes a washer fluid connection unit connected to a reservoir (not shown) located within a vehicle chassis so that the fluid may flow therebetween.

The washer fluid connection unit includes a washer fluid cable (not shown) having ductility located within the vehicle chassis and includes the washer fluid pipe 510 configured to be coupled with the washer fluid nozzle 500. The washer fluid pipe 510 is configured to be formed along the frame connection shaft 111, and in one embodiment, to be connected to at least one washer fluid nozzle 500 in the width direction of the frame 240 within the frame 240.

In one embodiment, the washer fluid nozzle 500 may be located at a portion of the frame 240 facing the windshield 700, i.e., be located adjacent to the first blade 210.

Therefore, when the wiper assembly 200, interlocked with the rotary roller 110, is shifted towards the lower end of the windshield 700, the washer fluid may be sprayed onto the moving path of the first blade 210. The sprayed washer fluid may be removed from the surface of the windshield 700 by the first blade 210.

In accordance with another embodiment of the present disclosure, the washer fluid nozzle 500 may be configured to be located at a position adjacent to the second blade 220. The washer fluid nozzle 500 may also be configured to spray the washer fluid to the upper surface of the windshield 700 through the washer fluid pipe 510 configured to be connected to the washer fluid nozzle 500 along the frame connection shaft 111 so that the fluid may flow therebetween.

As such, the contaminant removal apparatus 100 for windshields of the present disclosure is configured such that the washer fluid flowing into the wiper assembly 200 may be sprayed onto the upper surface of the windshield 700. The washer fluid may be sprayed through the washer fluid nozzle 500 formed adjacent to at least one of the first blade 210 or the second blade 220.

Figure 8A:
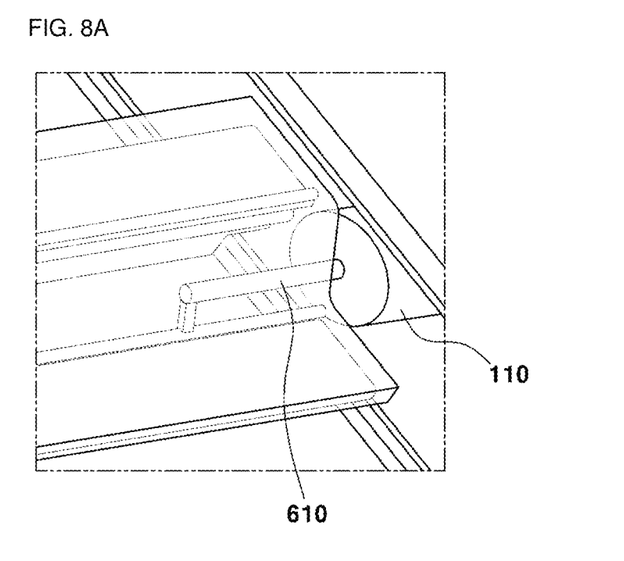
FIG. 8A is a view illustrating a coupling relation between a coating nozzle and a coating fluid pipe connected to the coating nozzle in accordance with one embodiment of the present disclosure.
Figure 8B:
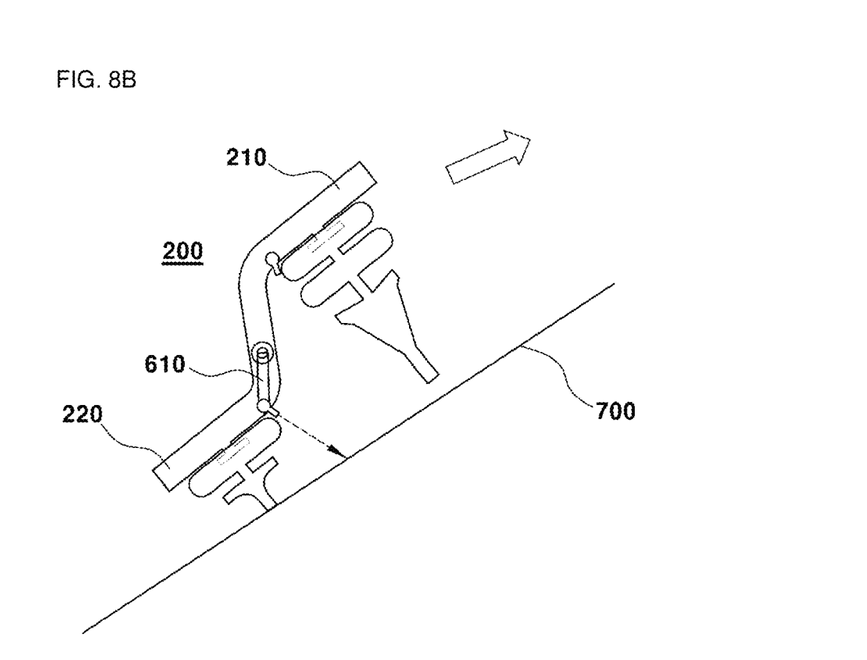
FIG. 8B is a side view of the frame on which the coating nozzle is located, in accordance with one embodiment of the present disclosure.

FIG. 8A is a view illustrating a coating fluid pipe 610 located in the frame connection shaft 111. FIG. 8B is a view illustrating a coupling relation between a coating nozzle 600 and an element connected to the coating nozzle 600 to provide a coating fluid to the upper surface of the windshield 700.

In accordance with one embodiment of the present disclosure, the coating fluid pipe 610 is configured to be located at the other end of the frame connection shaft 111 opposite to the one end of the frame connection shaft 111, in which the washer fluid pipe 510 is located, so as to spray the coating fluid stored in the vehicle to the upper surface of the windshield 700 through the wiper assembly 200.

The coating fluid pipe 610 is formed integrally with the frame connection shaft 111 so as to be shifted together with the frame connection shaft 111 in the height direction of the windshield 700. Thus, the coating fluid collected in a reservoir located in the interior of the vehicle is supplied to the coating fluid pipe 610 by a tube or a cable formed of a ductile material.

Further, the coating nozzle 600 is configured such that the fluid may flow along the inside of the frame 240. Thus, the coating nozzle 600 provided at a position adjacent to the second blade 220 sprays the coating fluid.

The coating nozzle 600 is located on one surface of the frame 240 facing the windshield 700. In this embodiment, at least one coating nozzle 600 may be located in the width direction of the frame 240.

In accordance with one embodiment of the present disclosure, the coating fluid pipe 610 is configured to supply the coating fluid to the coating nozzle 600 located at a position adjacent to the second blade 220. Thus, when the wiper assembly 200 is shifted towards the upper end of the windshield 700, the coating nozzle 600 is located in front of the second blade 220.

Therefore, when the wiper assembly 200 is shifted upwards, the second blade 220 may pass through a region onto which the coating fluid was already sprayed, so that the upper surface of the windshield 700 may be coated with the coating fluid.

Referring to FIGS. 7A to 8B, the contaminant removal apparatus 100 for windshields in which the wiper assembly 200 includes the washer fluid nozzle 500 and the coating nozzle 600 and at least one of the washer fluid or the coating fluid is selectively sprayed depending on upward or downward shifting of the wiper assembly 200.

Figure 9:
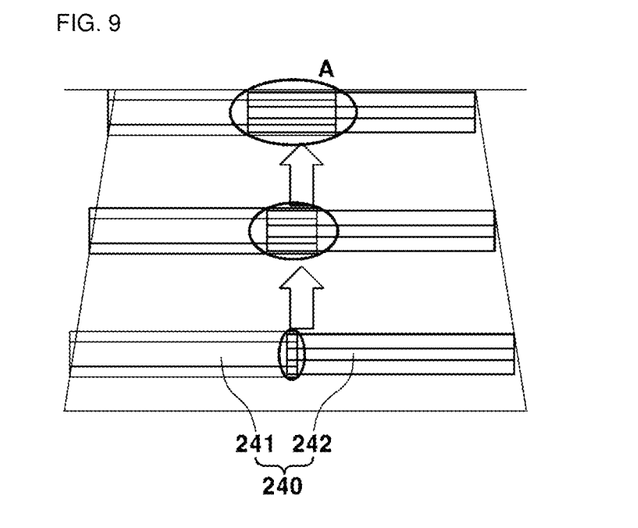
FIG. 9 is a front view of a frame having a length which is varied in response to a width change depending on the height of a windshield, in accordance with one embodiment of the present disclosure.

FIG. 9 illustrates the frame 240 having a variable length of the wiper assembly 200 in accordance with one embodiment of the present disclosure.

The wiper assembly 200 in accordance with the present disclosure is located at a position corresponding to the width direction of the windshield 700 of the vehicle. The wiper assembly 200 is configured such that the length of the frame 240 of the wiper assembly 200 may be varied in response to a different width of the windshield 700 according to the height thereof.

The frame 240 may include at least two sub-frames, which have any coupling relation therebetween so that the length of the frame 240 is variable in the width direction of the windshield 700. Therefore, the sub-frames may be coupled to each other in a foldable way, a retractable way, or the like.

In accordance with one embodiment of the present disclosure, the frame 240 includes two sub-frames, i.e., a first sub-frame 241 and a second sub-frame 242 disposed in the width direction of the windshield 700. The first and second sub-frames 241 and 242 are configured such that one end of the first sub-frame 241 is inserted into the second sub-frame 242.

Therefore, the frame 240 coupled to the frame connection shafts 111 is shifted in the upward and downward directions of the windshield 700 according to shifting of the rotary rollers 110. The first sub-frame 241 is inserted into the second sub-frame 242 in response to a change in the width of the windshield 700, and thus the wiper assembly 200 may be shifted along the windshield 700 having the variable width.

The first sub-frame 241 and the second sub-frame 242 are configured such that the first blade 210 and the second blade 220 are located at each of the first sub-frame 241 and the second sub-frame 242. Thus, a total of four blades 210 and 220 may be located in an area A in which the first sub-frame 241 and the second sub-frame 242 overlap each other.

As is apparent from the above description, a contaminant removal apparatus for windshields in accordance with one embodiment of the present disclosure may have the following effects through the above-described configuration and coupling and using relations.

The contaminant removal apparatus for windshields is configured to be shifted towards the upper and lower ends of a windshield so as to remove contaminants from the windshield and may thus provide improvement in user visibility.

The contaminant removal apparatus for windshields may provide a relatively broader field of view to an autonomous vehicle.

Further, the contaminant removal apparatus for windshields includes a wiper assembly having a width, which is varied depending on the width of the windshield and may thus have high compatibility.

The present disclosure has been described in detail with reference to specific embodiments thereof. However, it should be appreciated by those having ordinary so skill in the art that changes may be made in these embodiments without departing from the principles and spirit of the disclosure, the scope of which is defined in the appended claims and their equivalents.

What is claimed is:

1. A contaminant removal apparatus for windshields, the contaminant removal apparatus comprising:
   driving belts configured to be located at both side surfaces of a windshield;
   a drive unit configured to apply driving force to the driving belts;
   rotary rollers configured to be shifted along the driving belts;
   a wiper assembly configured to selectively contact the windshield and to be shifted along the rotary rollers; and
   a controller configured to change a rotating direction of the drive unit.

2. The contaminant removal apparatus of claim 1, further comprising:
   idle gears located at ends of the driving belts to change a rotating direction of the rotary rollers; and
   frame connection shafts coupled to both ends of the wiper assembly and located within the rotary rollers so as to contact the idle gears to change the rotating direction of the rotary rollers.

3. The contaminant removal apparatus of claim 2, wherein the wiper assembly comprises:
   a frame configured to be coupled to the frame connection shafts;
   a first blade located at one end of the frame; and
   a second blade located at the other end of the frame,
   wherein, as the frame is rotated about the frame connection shafts, the first blade and the second blade are configured to selectively contact a windshield.

4. The contaminant removal apparatus of claim 3, wherein, when the frame connection shafts contact the idle gears, the controller rotates the frame by a designated angle and then changes the rotating direction of the rotary rollers.

5. The contaminant removal apparatus of claim 3, wherein:
   a washer fluid nozzle is provided at a position adjacent to the first blade and is configured to spray a washer fluid onto an upper surface of a windshield through the washer fluid nozzle.

6. The contaminant removal apparatus of claim 3, wherein:
   a coating nozzle is provided at a position adjacent to the second blade and is configured to spray a coating fluid onto an upper surface of a windshield through the coating nozzle.

7. The contaminant removal apparatus of claim 3, wherein:
   the frame comprises at least two sub-frames; and
   the at least two sub-frames overlap each other so that a length of the frame is varied in a width direction relative to a windshield.

8. The contaminant removal apparatus of claim 3, wherein the first blade is configured to be located closer to an upper end of a windshield than the second blade and to contact the windshield when the wiper assembly is shifted downwards along the windshield.

9. The contaminant removal apparatus of claim 8, wherein the second blade is configured to contact a windshield when the wiper assembly is shifted upwards along the windshield.

10. The contaminant removal apparatus of claim 2, wherein the idle gears contact the frame connection shafts to change the rotating direction of the rotary rollers.

11. The contaminant removal apparatus of claim 1, further comprising guide rails configured to be located along a windshield,
wherein the driving belts are located within the guide rails.

12. The contaminant removal apparatus of claim 1, wherein the controller is configured to control the wiper assembly to be located at an uppermost or lowermost end of a windshield when the wiper assembly is not operated.

13. The contaminant removal apparatus of claim 1, wherein the controller controls the wiper assembly to be locally shifted within a region of a windshield where a sensor unit is installed.

14. A contaminant removal system comprising:
a windshield of a vehicle;
driving belts located at both side surfaces of the windshield;
a drive unit configured to apply driving force to the driving belts;
rotary rollers configured to be shifted along the driving belts;
a wiper assembly positioned to selectively contact the windshield and to be shifted along the rotary rollers; and
a controller configured to change a rotating direction of the drive unit.

* * * * *